UNITED STATES PATENT OFFICE.

JULIUS ALTSCHUL, OF BERLIN, GERMANY, ASSIGNOR TO ACTIEN GESELLSCHAFT FÜR ANILIN FABRIKATION, OF BERLIN, GERMANY.

PROCESS OF MAKING DIALKYLBARBITURIC ACID.

No. 798,863. Specification of Letters Patent. Patented Sept. 5, 1905.

Application filed January 10, 1905. Serial No. 240,504.

*To all whom it may concern:*

Be it known that I, JULIUS ALTSCHUL, of Berlin, in the Kingdom of Prussia, German Empire, have invented new and useful Improvements in Processes of Preparing Dialkylbarbituric Acids; and I do hereby declare that the following is a full, clear, and exact description of the invention, which will enable others skilled in the art to which it appertains to make and use the same.

My invention relates to a new process of preparing dialkylbarbituric acids having the general formula

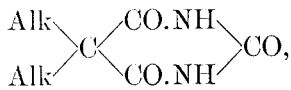

in which formula "alk" means alkyl radicals. I have found that these compounds can be prepared with a very good yield by condensing dialkylmalonamids with neutral alkyl ethers of carbonic acid according to the following general equation:

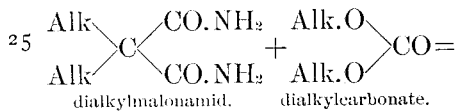
dialkylmalonamid.    dialkylcarbonate.

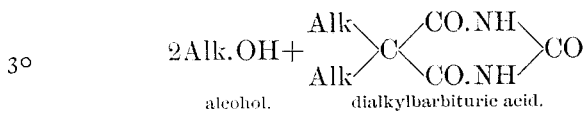
alcohol.    dialkylbarbituric acid.

The condensation is produced by heating the above starting products in the presence of suitable alkaline condensing agents—such as, for instance, alkali alcoholates—with or without the addition of a suitable solvent. As the condensation is carried out in the presence of an alkaline condensing agent, there is formed an alkali salt of dialkylbarbituric acid, from which the free dialkylbarbituric acid is obtained by the action of a suitable acid.

In order to carry out my invention, I proceed, for instance, as follows, the parts being by weight: Three parts of diethylmalonamid $(C_2H_5)_2C.(CO.NH_2)_2$ are mixed with three parts of sodium ethylate and three parts of diethyl carbonate, and the mixture is heated for several hours in a vessel provided with a reflux condenser. The alcohol formed is then distilled off, the remaining dry residue is dissolved in cold water, the solution filtered off from small quantities of unaltered amid, and the diethylbarbituric acid is then precipitated by addition of hydrochloric acid to the filtrate. By recrystallization from water the acid is at once obtained in a chemically-pure state, showing the melting-point of 191° centigrade.

The above-given proportions of the ingredients used can be varied within wide limits. It was, however, found advantageous in order to obtain good yields to use for one molecular proportion of diethylmalonamid more than one molecular proportion of ethyl carbonate and more than two molecular proportions of sodium ethylate. Instead of employing sodium ethylate in the dry state the condensation can also be produced by using a solution of sodium ethylate in ethyl alcohol, the process as for the rest being carried out in the same manner as above described. The process proceeds likewise in an analogous manner if instead of diethylmalonamid other dialkylmalonamids or instead of sodium ethylate other alkali alcoholates or other suitable alkaline condensing agents or if instead of diethyl carbonate other dialkyl carbonates are used.

Having now described my invention and in what manner the same is to be performed, what I claim as new is—

1. The process of preparing dialkylbarbituric acids having the above-given general formula which process consists in condensing dialkylmalonamids with dialkyl carbonates in the presence of suitable alkaline condensing agents and isolating from the resulting product the free dialkylbarbituric acid, substantially as hereinbefore described.

2. The process of preparing diethylbarbituric acid which process consists in condensing diethylmalonamid $(C_2H_5)_2C.(CO.NH_2)_2$ with dialkyl carbonate in the presence of suitable alkaline condensing agents and isolating from the resulting product the free diethylbarbituric acid, substantially as hereinbefore described.

3. The process for the production of diethylbarbituric acid which process consists in heating diethylmalonamids with sodium ethylate and diethyl carbonate and isolating from the resulting product the free diethylbarbituric acid, substantially as hereinbefore described.

In witness whereof I have hereunto signed my name, this 16th day of December, 1904, in the presence of two subscribing witnesses.

JULIUS ALTSCHUL.

Witnesses:
HENRY HASPER,
WOLDEMAR HAUPT.